United States Patent
Xu

(10) Patent No.: US 9,158,726 B2
(45) Date of Patent: Oct. 13, 2015

(54) SELF TERMINATED DYNAMIC RANDOM ACCESS MEMORY

(75) Inventor: Chao Xu, Thousand Oaks, CA (US)

(73) Assignee: Inphi Corporation, Santa Clara, CA (US)

( * ) Notice: Subject to any disclaimer, the term of this patent is extended or adjusted under 35 U.S.C. 154(b) by 0 days.

(21) Appl. No.: 13/587,887

(22) Filed: Aug. 16, 2012

(65) Prior Publication Data

US 2013/0159616 A1 Jun. 20, 2013

Related U.S. Application Data

(60) Provisional application No. 61/576,914, filed on Dec. 16, 2011, provisional application No. 61/577,256, filed on Dec. 19, 2011.

(51) Int. Cl.
*G06F 13/40* (2006.01)

(52) U.S. Cl.
CPC ......... *G06F 13/4086* (2013.01); *Y02B 60/1228* (2013.01); *Y02B 60/1235* (2013.01)

(58) Field of Classification Search
USPC ......................................................... 711/105
See application file for complete search history.

(56) References Cited

U.S. PATENT DOCUMENTS

| | | |
|---|---|---|
| 5,592,612 A | 1/1997 | Birk |
| 6,128,094 A | 10/2000 | Smith |
| 6,400,621 B2 | 6/2002 | Hidaka et al. |
| 6,484,278 B1 | 11/2002 | Merritt et al. |
| 6,486,493 B2 | 11/2002 | Arimoto et al. |
| 6,542,956 B1 | 4/2003 | Lee et al. |
| 6,601,130 B1 | 7/2003 | Silvkoff et al. |
| 6,898,142 B2 | 5/2005 | Takahashi |
| 6,980,427 B2 | 12/2005 | Garnett et al. |
| 6,993,701 B2 | 1/2006 | Corbett et al. |
| 7,193,844 B2 | 3/2007 | Garnett et al. |
| 7,359,261 B1 | 4/2008 | Wu et al. |
| 7,379,361 B2 | 5/2008 | Co et al. |
| 7,656,727 B2 | 2/2010 | Thayer |
| 7,990,746 B2 | 8/2011 | Rajan |
| 8,325,554 B2 | 12/2012 | Sweere et al. |
| 8,631,194 B2 | 1/2014 | Wakasa |

(Continued)

OTHER PUBLICATIONS

Office Action for U.S. Appl. No. 13/653,373, dated Mar. 27, 2014.

(Continued)

*Primary Examiner* — Matthew Bradley
(74) *Attorney, Agent, or Firm* — Richard T. Ogawa; Ogawa P.C.

(57) ABSTRACT

A method for operating a memory system and a memory buffer device. The method includes receiving an external clock signal from a clock device of a CPU of a host computer to a buffer device, and receiving an ODT signal from the CPU to a command port of the buffer device. Buffer device provides the self-termination information internally to the common data bus by automatically detecting the read or write command on the common command bus and adjust the termination resistor array in a pre-determined value and timing fashion so that information can be read from or write to a data line of only one of the plurality of DIMM devices coupled together through a common data bus interface. All DIMM devices other than the DIMM device being read can be maintained in a termination state to prevent any signal from traversing to the common the common data bus interface.

20 Claims, 17 Drawing Sheets

(56) References Cited

U.S. PATENT DOCUMENTS

| | | |
|---|---|---|
| 8,687,451 B2 | 4/2014 | Wang |
| 2003/0048613 A1 | 3/2003 | Garnett et al. |
| 2004/0032772 A1 | 2/2004 | Takahashi |
| 2004/0123029 A1 | 6/2004 | Dalal et al. |
| 2004/0138868 A1 | 7/2004 | Kuznetsov et al. |
| 2004/0184329 A1 | 9/2004 | Horiguchi et al. |
| 2004/0243879 A1 | 12/2004 | Hou et al. |
| 2005/0010709 A1 | 1/2005 | Davies et al. |
| 2006/0200697 A1 | 9/2006 | Ito |
| 2008/0104290 A1 | 5/2008 | Cowell et al. |
| 2008/0183959 A1 | 7/2008 | Pelley et al. |
| 2009/0055665 A1 | 2/2009 | Maglione et al. |
| 2009/0141558 A1 | 6/2009 | Sarin et al. |
| 2009/0300259 A1 | 12/2009 | Luo et al. |
| 2010/0005212 A1 | 1/2010 | Gower et al. |
| 2010/0162037 A1 | 6/2010 | Maule et al. |
| 2010/0199125 A1 | 8/2010 | Reche |
| 2010/0274952 A1 | 10/2010 | Lee |
| 2011/0029752 A1 | 2/2011 | Sutardja et al. |
| 2011/0072200 A1 | 3/2011 | Lee et al. |
| 2011/0125990 A1 | 5/2011 | Khosravi et al. |
| 2011/0170329 A1 | 7/2011 | Kang |
| 2011/0307647 A1 | 12/2011 | Stalzer |
| 2012/0079182 A1 | 3/2012 | Bains |
| 2012/0089854 A1 | 4/2012 | Breakstone et al. |
| 2012/0124186 A1 | 5/2012 | Emerson et al. |
| 2012/0151294 A1 | 6/2012 | Yoo et al. |
| 2012/0243299 A1 | 9/2012 | Shau |
| 2012/0257459 A1 | 10/2012 | Berke |
| 2012/0297231 A1 | 11/2012 | Qawami et al. |
| 2013/0016574 A1 | 1/2013 | Kim et al. |
| 2013/0060996 A1 | 3/2013 | Berke |

OTHER PUBLICATIONS

Notice of Allowance for U.S. Appl. No. 13/558,332, dated Feb. 25, 2014.
Office Action for U.S. Appl. No. 13/620,288, dated Oct. 1, 2013.
Office Action for U.S. Appl. No. 13/791,814, dated May 1, 2014.
Office Action for U.S. Appl. No. 13/619,692, dated May 14, 2014.
Office Action for U.S. Appl. No. 13/620,288, dated May 16, 2014.
Office Action for U.S. Appl. No. 13/791,807, dated May 29, 2014.
Office Action for U.S. Appl. No. 14/178,241, dated Jun. 27, 2014.
Office Action for U.S. Appl. No. 13/791,124, dated Sep. 2, 2014.
Office Action for U.S. Appl. No. 13/791,124, dated Dec. 4, 2014.
Notice of Allowance for U.S. Appl. No. 13/778,531, dated Sep. 4, 2014.
Office Action for U.S. Appl. No. 13/620,288, dated Sep. 12, 2014.
Office Action for U.S. Appl. No. 13/653,373, dated Sep. 16, 2014.
Office Action for U.S. Appl. No. 13/782,348, dated Oct. 3, 2014.
Notice of Allowance for U.S. Appl. No. 13/787,282, dated Oct. 8, 2014.
Notice of Allowance for U.S. Appl. No. 13/787,350, dated Oct. 8, 2014.
Office Action for U.S. Appl. No. 13/689,986, dated Oct. 21, 2014.
Notice of Allowance for U.S. Appl. No. 13/689,986, dated Dec. 10, 2014.
Notice of Allowance for U.S. Appl. No. 13/791,807, dated Oct. 23, 2014.

AL: additive latency
CL: CAS latency
ML: memory buffer latency
BL: burst length

AL: additive latency
CWL: CAS write latency
BL: burst length

| Rtt_nomCtrl | Rtt_wrCtrl | Resistor Array Resistance Value |
|---|---|---|
| 0 | 0 | Infiniti (Float) |
| 0 | 1 | Infiniti (Float) |
| 1 | 0 | Rtt_nom |
| 1 | 1 | Rtt_wr |

Rtt_nom and Rtt_wr are register definied resistance values

FIGURE 12

SELF TERMINATED DYNAMIC RANDOM ACCESS MEMORY

CROSS-REFERENCE TO RELATED APPLICATIONS

This application claims priority to U.S. Ser. Nos. 61/576,914, filed Dec. 16, 2011, and 61/577,256, filed Dec. 19, 2011, each of which is commonly assigned, and hereby incorporated by reference herein.

BACKGROUND OF THE INVENTION

In a memory system where a memory controller controls multiple memory devices, interface devices are often deployed to improve the quality of the signal transmissions between the memory controller and the memory devices. As an example, DDR2 and DDR3 Registered memory modules use one or more registers to buffer and re-drive the command, control and address signals from the host memory controller to multiple DDR2 and DDR3 SDRAM devices. As a second example, DDR3 Load-Reducing Memory Modules (LRDIMM) use a memory buffer to re-drive the command, control, address and data signals from the host memory controller to and from multiple DDR3 SDRAM devices.

Memory interface devices can be used to isolate or segment portions of the memory system from each other, improving the quality of signal transmission as well as potentially reducing the power consumption of the memory system and improving the reliability characteristics of the memory system.

High-speed digital signals, such as the data, clock and control signals that are conveyed between a host controller and a memory module, are typically received by a respective receiver circuits. Each signal is also typically terminated, usually to the junction point of a voltage divider. However, this arrangement can be inefficient, as current is always being conducted (bled) by one branch or the other of the divider.

From the above, it is seen that techniques for improving memory module devices and methods of use are highly desirable.

BRIEF SUMMARY OF THE INVENTION

The present invention relates to memory storage systems and devices. More specifically, the present invention provides a method for operating a memory module device and a memory buffer device. Merely by way of example, the invention has been provided for the application of DDR3 and DDR4 SDRAM devices, but it should be recognized that the methods described herein can be applied to other memory storage systems and the like. Additionally, such memory storage systems can be used for a variety of applications such as network and/or computer storage systems, computer servers, hand held computing devices, portable computing devices, computer systems, network appliances and/or switches, routers, and gateways, and the like.

In a specific embodiment, the invention provides a method for operating a computing device. The method includes receiving a command signal for a target DRAM device from a plurality of DIMM devices from a CPU device and determining whether the command signal is either a read command for a read cycle or write command for a write cycle. The method includes maintaining an ignore state upon receiving an ODT signal by decoupling any logic operation from the ODT signal and transferring information through a data line to the target DRAM device from the plurality of DIMM devices coupled together through a common data bus interface, while maintaining each of the other DIMM devices in a termination state to prevent any undesirable signals from traversing to the common data bus interface.

In an alternative embodiment, the present invention provides a memory buffer device. The device includes a bi-directional data bus line port, a command line port, and an address line port. The device also includes an array of elements coupled to the logic block. The logic block is coupled to the bi-directional data bus line port, the command line port, and the address line port, and is configured with the array of elements to provide a termination state to each of a plurality of DRAM devices while allowing a selected DRAM device to have access to the bi-directional data bus line port during a read cycle or a write cycle.

In a specific embodiment, the present invention provides for techniques to self-terminate a dynamic random access memory device for efficient operation during either a read cycle or a write cycle for a target DRAM device. In an example, the present invention provides a method to terminate the memory module host interface asynchronously; in contrast, conventional techniques terminate the memory module synchronously with a host controller ODT timing signal. In an alternative example, the techniques include a termination method to handle the read data asynchronous skews within one memory module and among different modules, which are configured differently from each other.

Another example provides a method to implement this asynchronous termination scheme within a memory buffer chip. Another example provides a method by which a memory buffer terminates the bus based on DRAM read and write command timing, and not from host memory controller ODT signal, which is maintained in an ignore state. In another example, the invention provides a method to control the termination timing based on the output enable signal in the memory buffer. In yet another example, the present technique provides a method to remove intra-operability limitations caused by large skews of the memory modules, which are different from each other, in the computing system.

In yet another example, the present technique provides for a termination scheme, which improves the system margining due to asynchronous termination timing control. Another technique provides for a termination scheme that improves the system performance due to reducing the termination turn-around time, and also provides for a termination scheme that reduces the memory buffer power by controlling termination time. That is, the present termination technique reduces a possibility of any redundant clock cycles often required using conventional ODT termination, which tends to provide for a larger window of clock cycles to accommodate timing differences in transferring information from different DRAM devices. These and other features are further described throughout the present specification, and more particularly below.

In an embodiment, the present invention includes a method of operating a memory system. The method can include receiving an external clock signal from a clock device of a CPU of a host computer to a buffer device. The buffer device can be coupled to a memory controller coupled to a plurality of DIMM devices consisting of DIMM 0, DIMM 1, through DIMM N, where N is an integer of at least two and greater. In a specific embodiment, the external clock signal can be derived from a host computer external to the memory controller, buffer device, and the plurality of DIMM devices. The buffer device, memory controller, and plurality of DIMM devices can also be configured on a common substrate member.

The method can also include receiving an On-Die Termination (ODT) signal from the CPU to a command port of the buffer device. An ignore state can be maintained at the buffer device for the ODT signal from the CPU. Information can be provided from a data line of only one of the plurality of DIMM devices coupled together through a common data bus interface. All (or selected ones) of the DIMM devices other than the DIMM device being read can be maintained in a termination state to prevent any signal from traversing to the common the common data bus interface in an example.

In a specific embodiment, the buffer device can include the common data bus and an interface to the memory controller. The buffer device can also be a storage controller. Each of the DIMM devices and be terminated via the buffer device. Also, the interface can be transferring information at a data rate of 1600 Mbps, 3200 Mbps, or the like. Additionally, the method can include providing information from a command address bus to determine the device being read, while the other DIMM devices are in the termination state. Those of ordinary skill in the art will recognize other variations, modifications, and alternatives.

Benefits are achieved over conventional techniques. In an embodiment, the benefit of allowing a memory system to be controlled by internally generated signals rather than host signals can be achieved. By controlling the termination scheme and timing by each memory device internally, we can achieve asynchronously termination on the common data bus among multiple devices on the system and improve the signal quality on the bus. This invention also enables multiple heterogeneous devices co-exist on the common data bus and improve the compatibility with each other. Combinations or a variety of DIMM modules can also be implemented. Depending upon the specific embodiment, one or more of these benefits may be achieved. Of course, there can be other variations, modifications, and alternatives.

The present invention achieves these benefits and others in the context of known memory technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 12 is a simplified diagram of a logic table for a memory system according to an embodiment of the present invention;

DETAILED DESCRIPTION OF THE INVENTION

Figure 1:
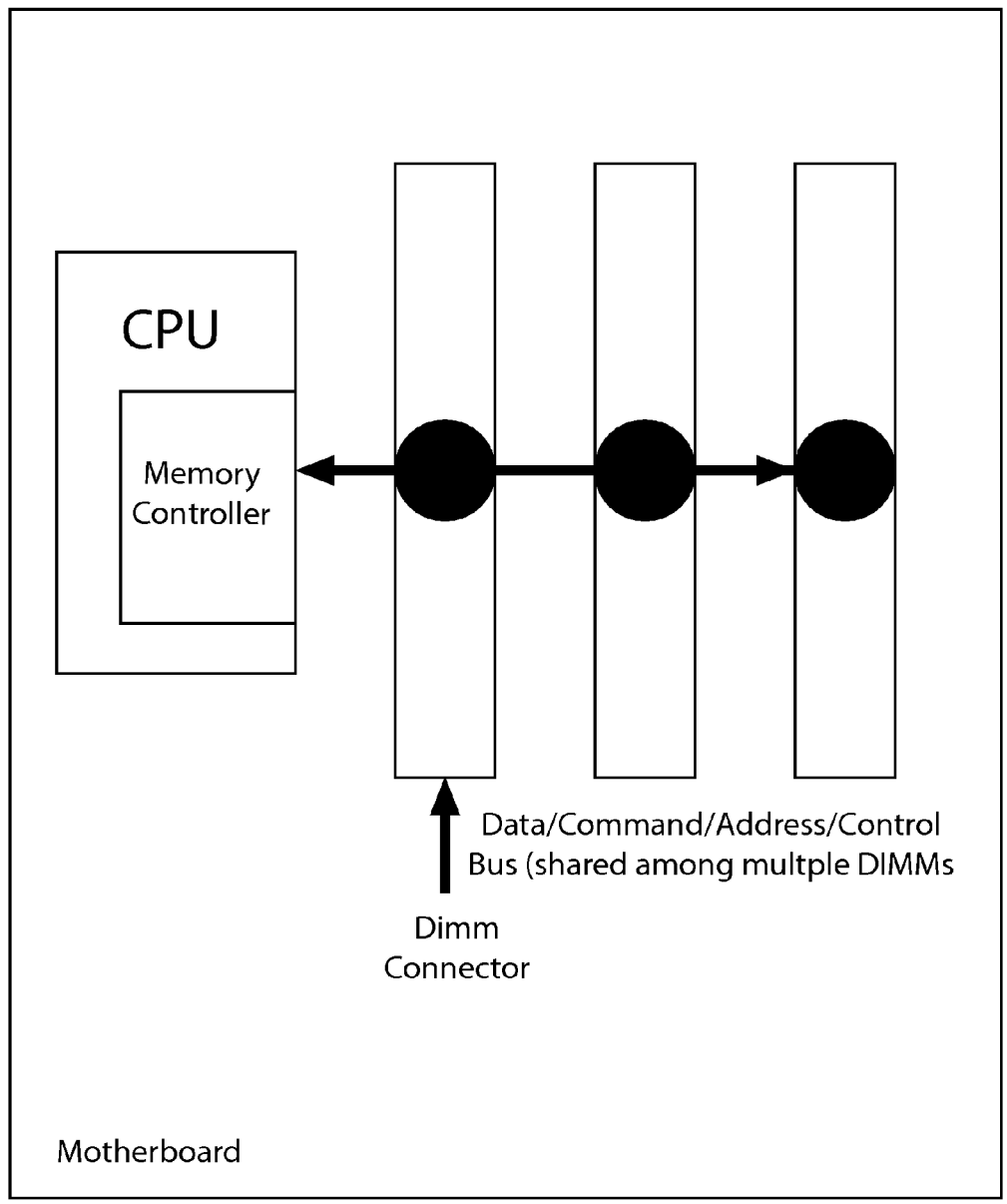
FIG. 1 is a simplified block diagram of a memory system according to an embodiment of the present invention.

This present invention relates to memory storage systems and devices. More particularly, the present invention provides a memory system and a method of operating a memory system and a memory buffer device. Merely by way of example, the invention has been provided for the application of DDR3 and DDR4 SDRAM devices, but it would be recognized that the methods described herein can be applied to other memory storage systems and the like. Additionally, such memory storage systems can be used for a variety of applications such as network and/or computer storage systems, computer servers, hand held computing devices, portable computing devices, computer systems, network appliances and/or switches, routers, and gateways, and the like.

In a specific embodiment, the invention provides a method for operating a computing device. The method includes receiving a command signal for a target DRAM device from a plurality of DIMM devices from a CPU device and determining whether the command signal is either a read command for a read cycle or write command for a write cycle. The method includes maintaining an ignore state upon receiving an ODT signal by decoupling any logic operation from the ODT signal and transferring information through a data line to the target DRAM device from the plurality of DIMM devices coupled together through a common data bus interface, while maintaining each of the other DIMM devices in a termination state to prevent any undesirable signals from traversing to the common data bus interface.

In an alternative embodiment, the present invention provides a system including a memory buffer device. The device includes a bi-directional data bus line port, a command line port, and an address line port. The device also includes an array of elements coupled to the logic block. The logic block is coupled to the bi-directional data bus line port, the command line port, and the address line port, and is configured with the array of elements to provide a termination state to each of a plurality of DRAM devices while allowing a selected DRAM device to have access to the bi-directional data bus line port during a read cycle or a write cycle.

In a specific example, the system further comprising a bi-directional data bus coupled to the bi-directional data bus port. The bi-direction data base is configured to transfer information from the selected DRAM at a data rate of 1600 Mbps and greater, while being free from any residual signals that are derived from any non-selected DRAM devices or any previously transferred information on the bi-directional data bus. The system may also include a host CPU device coupled to the memory buffer device. The host CPU device is configured to maintain the ODT signal in an off-state by turning on/off a software switch.

In an example, the plurality of DRAM devices is provided on a first DRAM module, which is one of plurality of DRAM modules configured on a larger module. The plurality of DRAM modules includes the first DRAM module and a second DRAM module. The first DRAM module has a first read or write latency characteristic and the second DRAM module has a second read or write latency characteristic such that the first read or write latency characteristic is different from the second read or write latency characteristic by more than one clock cycle, and has a skew.

In a specific embodiment, the present invention provides for techniques to self-terminate a dynamic random access memory device for efficient operation during either a read cycle or a write cycle for a target DRAM device, which is being addressed. In an example, the present invention provides a method to terminate the memory module host interface asynchronously without use of the ODT timing signal (in contrast, the conventional techniques terminate the memory module synchronously with a host controller ODT timing signal for a 72 bit data bus, which is difficult to achieve efficiently since depending upon the type and location of the particular DRAM device. That is, information may be transferred from the DRAM devices to the bus at slightly different times and may take a longer time to terminate each of the DRAM devices from timing differences).

In an alternative example, the techniques include a termination method to handle the read data asynchronous skews within one memory module and among different modules (i.e., made from different vendors or configurations), which are configured differently from each other. That is, each of the different memory modules have different read or write latency characteristics. Another example provides a method to implement this asynchronous termination scheme within a memory buffer chip. Another example provides a method by which a memory buffer terminates the bus based on DRAM read and write command timing, and not from host memory controller ODT signal, which is maintained in an ignore state.

In another example, the invention provides a method to control the termination timing based on the output enable signal in the memory buffer. In yet another example, the present technique provides a method to remove intra-operability limitations caused by large skews of the memory modules, which are different from each other, in the computing system. In yet another example, the present technique provides for a termination scheme, which improves the system margining due to asynchronous termination timing control. Another technique provides for a termination scheme that improves the system performance due to reducing the termination turnaround time, and also provides for a termination scheme that reduces the memory buffer power by controlling termination time. These and other features are further described throughout the present specification, and more particularly below.

FIG. 1 is a simplified block diagram of a memory system according to an embodiment of the present invention. This diagram is merely an illustration and should not unduly limit the scope of the claims herein. As shown, the system includes a motherboard including a central processing unit (CPU) coupled to three DIMM connector slots. In an embodiment, the CPU has one memory controller (FIG. 1), but can include multiple memory controllers. The memory controller shown has three DIMM slots, but the memory controller can have more than three slots. In this embodiment, each of the DIMM modules includes a memory buffer. However, those of ordinary skill in the art will recognize other variations, modifications, and alternatives.

Figure 2:
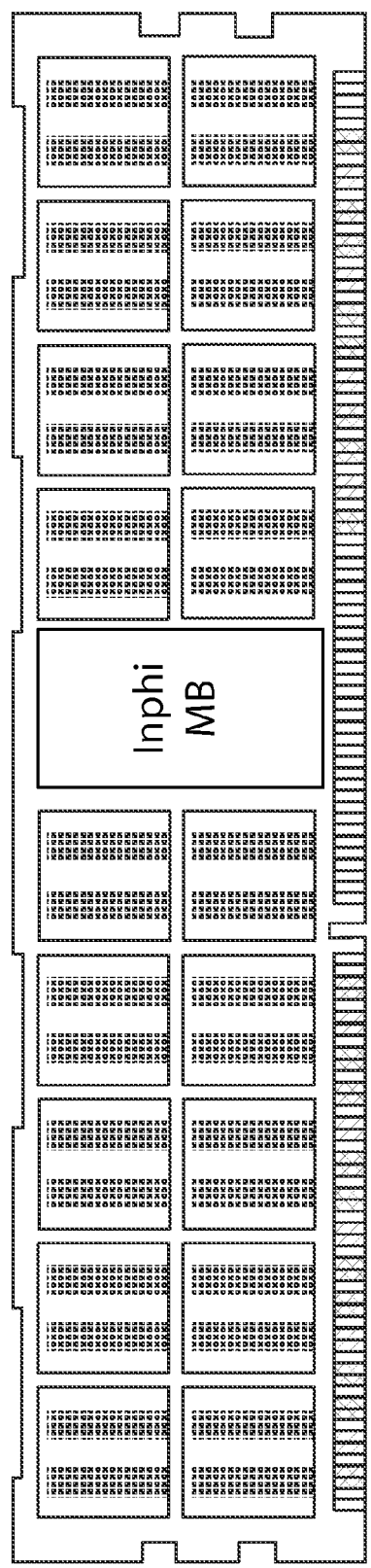
FIG. 2 is a simplified diagram of a memory module according to an embodiment of the present invention.

FIG. 2 is a simplified diagram of a memory module according to an embodiment of the present invention. This diagram is merely an illustration and should not unduly limit the scope of the claims herein. As shown, the memory module, or DIMM module, includes a plurality of storage devices, such as DRAM devices, flash memory devices, and the like. In an embodiment, the DIMM module also includes a memory buffer device, which can include a single chip or multiple chips. This DIMM module having the memory buffer can be used in the DIMM slots shown in the memory system block diagram of FIG. 1. Those of ordinary skill in the art will recognize other variations, modifications, and alternatives.

Figure 3:
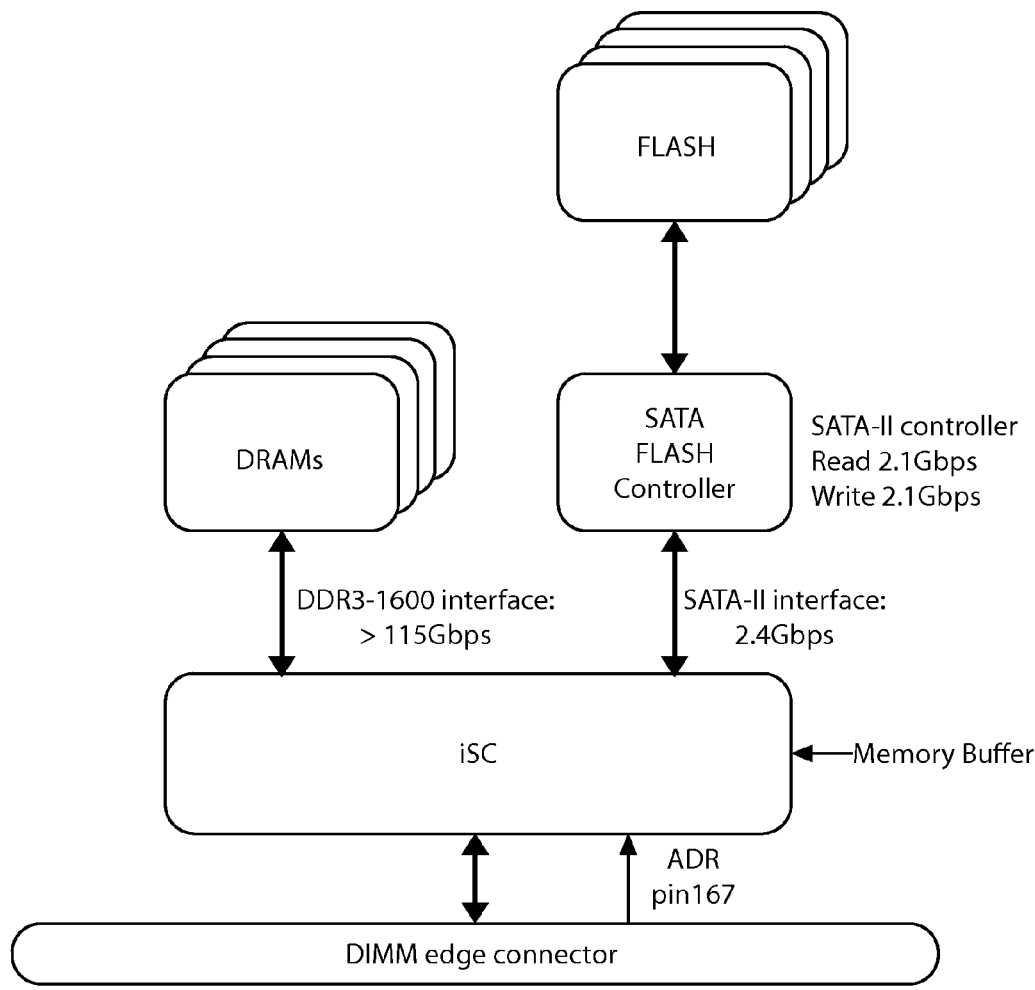
FIG. 3 is a simplified block diagram of a memory buffer interface according to an embodiment of the present invention.

FIG. 3 is a simplified block diagram of a memory buffer interface according to an embodiment of the present invention. This diagram is merely an illustration and should not unduly limit the scope of the claims herein. As shown, the memory buffer interface includes a memory buffer iSC, which is coupled to a plurality of DRAMs, a SATA FLASH controller, and a DIMM edge connector. In this embodiment, the SATA FLASH controller is also coupled a plurality of FLASH modules and can have a 2.1 Gbps data read speed and a 2.1 Gbps data write speed.

In a specific embodiment, the memory buffer interface can include a DDR-1600 interface between the memory buffer iSC and the plurality of DRAMs with a data transfer speed of greater than 115 Gbps. The memory buffer can also include a SATA-II interface between the memory buffer iSC and the SATA FLASH controller with a data transfer speed of 2.4 Gbps. Also, the memory buffer iSC and the DIMM edge connector can include an ADR pin167 connection. Of course, there can be other variations, modifications, and alternatives.

Figure 4:
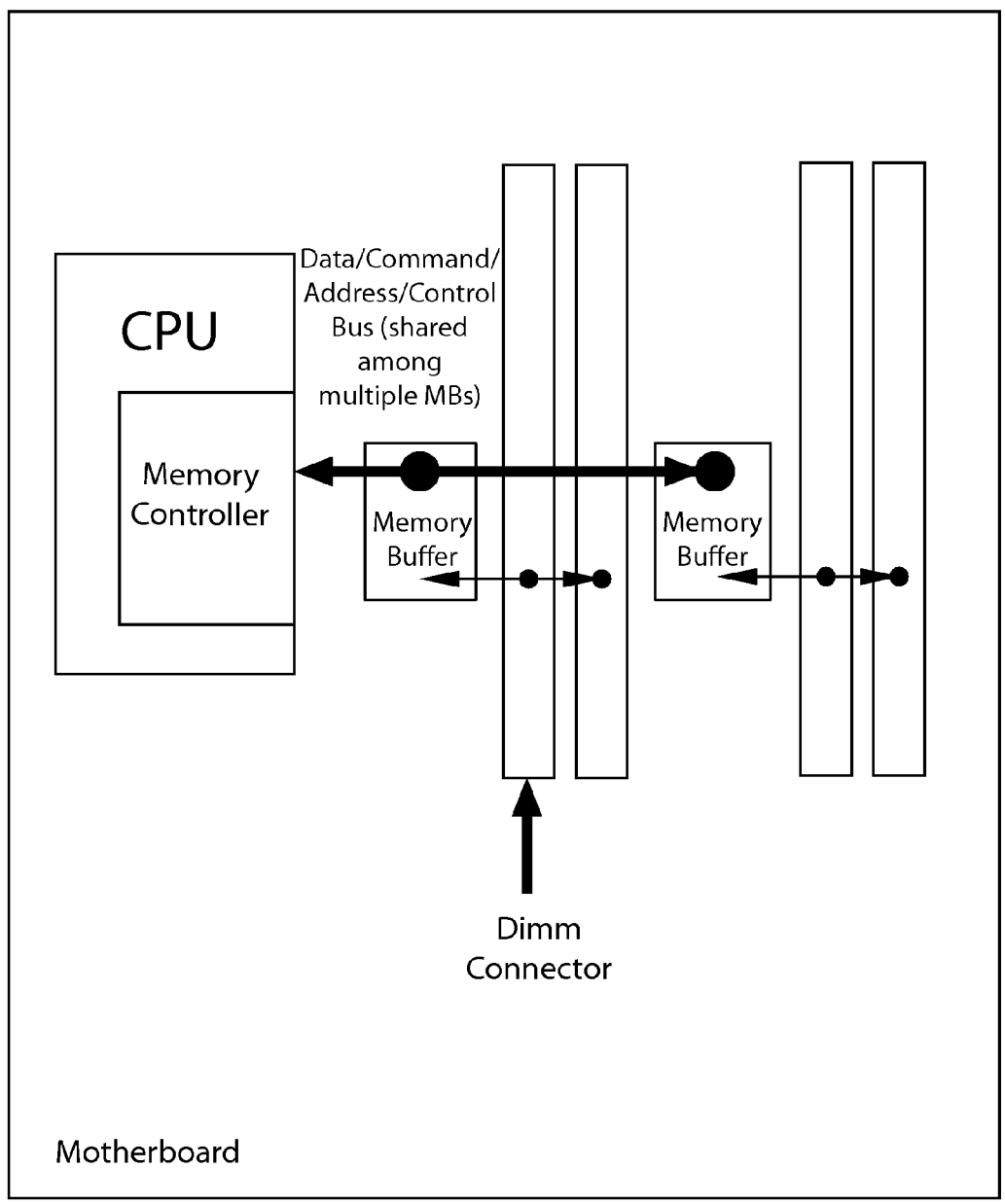
FIG. 4 is a simplified block diagram of a memory system according to an embodiment of the present invention.

FIG. 4 is a simplified block diagram of a memory system according to an embodiment of the present invention. This diagram is merely an illustration and should not unduly limit the scope of the claims herein. As shown, the system includes a motherboard including a central processing unit (CPU) coupled to two memory buffers on the motherboard. Each of the memory buffers is coupled to two DIMM slots. Each of these DIMM slots can be applied with regular standard DIMM module.

In an embodiment, the CPU has one memory controller (FIG. 4), but can include multiple memory controllers. The memory controller shown is coupled to two memory buffers, but can be coupled to more than two memory buffers. Each of the memory buffers shown is coupled to two DIMM slots, but each buffer can have more than two DIMM slots. In this embodiment, each of the memory buffers is configured on the motherboard. However, those of ordinary skill in the art will recognize other variations, modifications, and alternatives.

Figure 5:
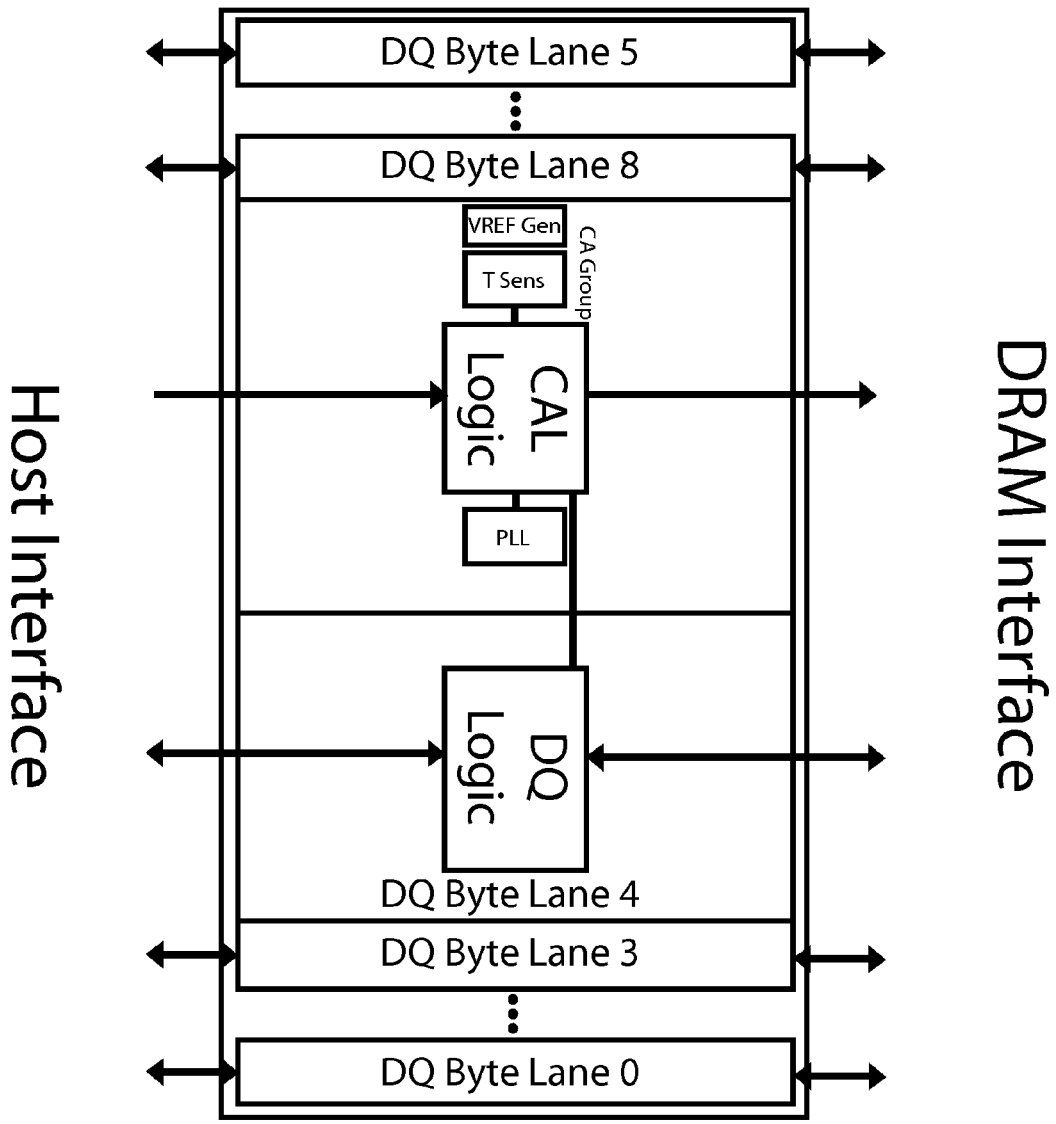
FIG. 5 is a simplified diagram of a buffer chip according to an embodiment of the present invention.

FIG. 5 is a simplified diagram of a buffer chip according to an embodiment of the present invention. This diagram is merely an illustration and should not unduly limit the scope of the claims herein. In an embodiment, the buffer chip shown can represent the memory buffers shown previously in FIGS. 1-4. There can be other variations, modifications, and alternatives.

Figure 6:
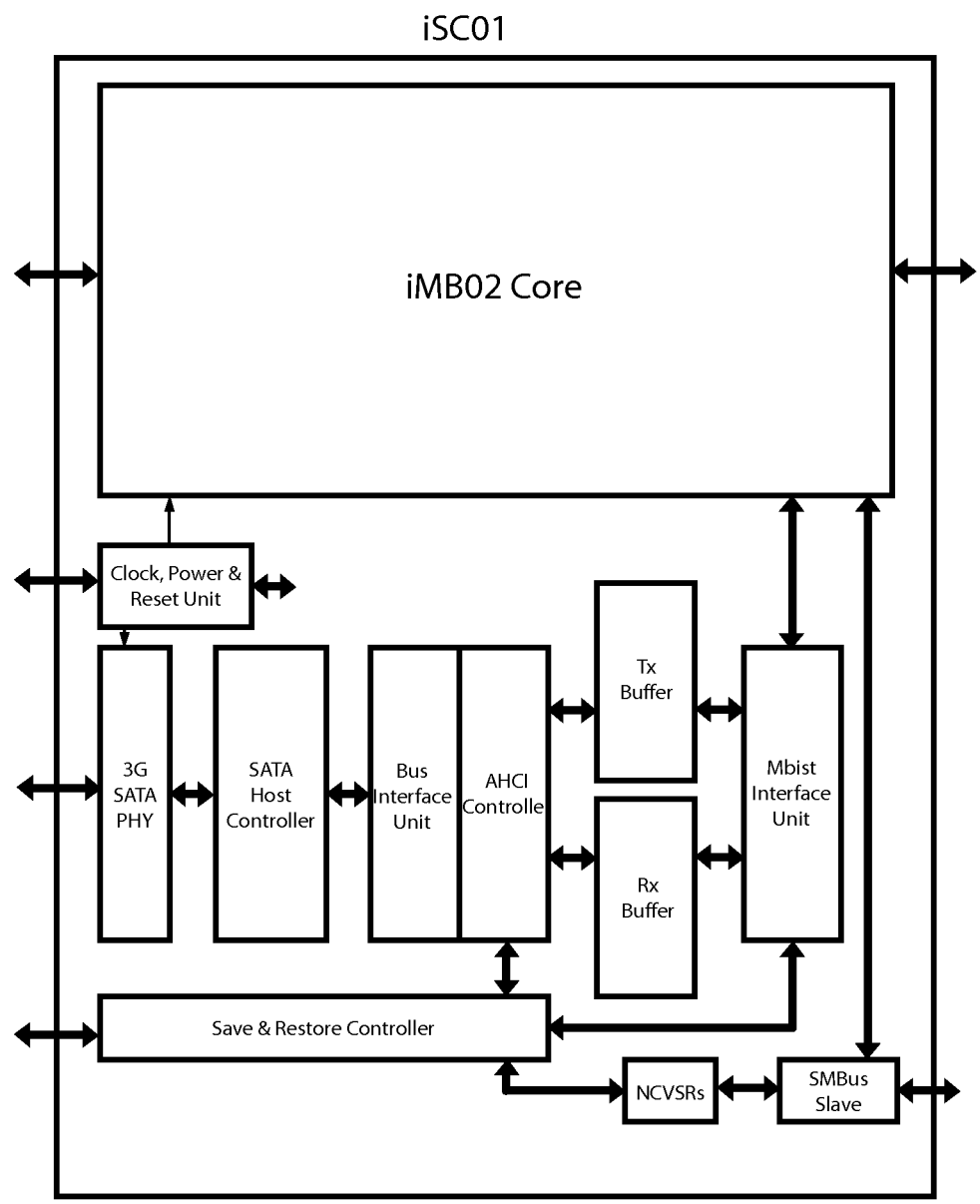
FIG. 6 is a simplified diagram of a buffer chip according to an embodiment of the present invention.

FIG. 6 is a simplified diagram of a buffer chip according to an embodiment of the present invention. This diagram is merely an illustration and should not unduly limit the scope of the claims herein. In an embodiment, the buffer chip shown can also represent the memory buffers shown previously in FIGS. 1-4. Compared to the buffer chip of FIG. 5, this buffer chip includes a storage controller. Again, there can be other variations, modifications, and alternatives.

Figure 7:
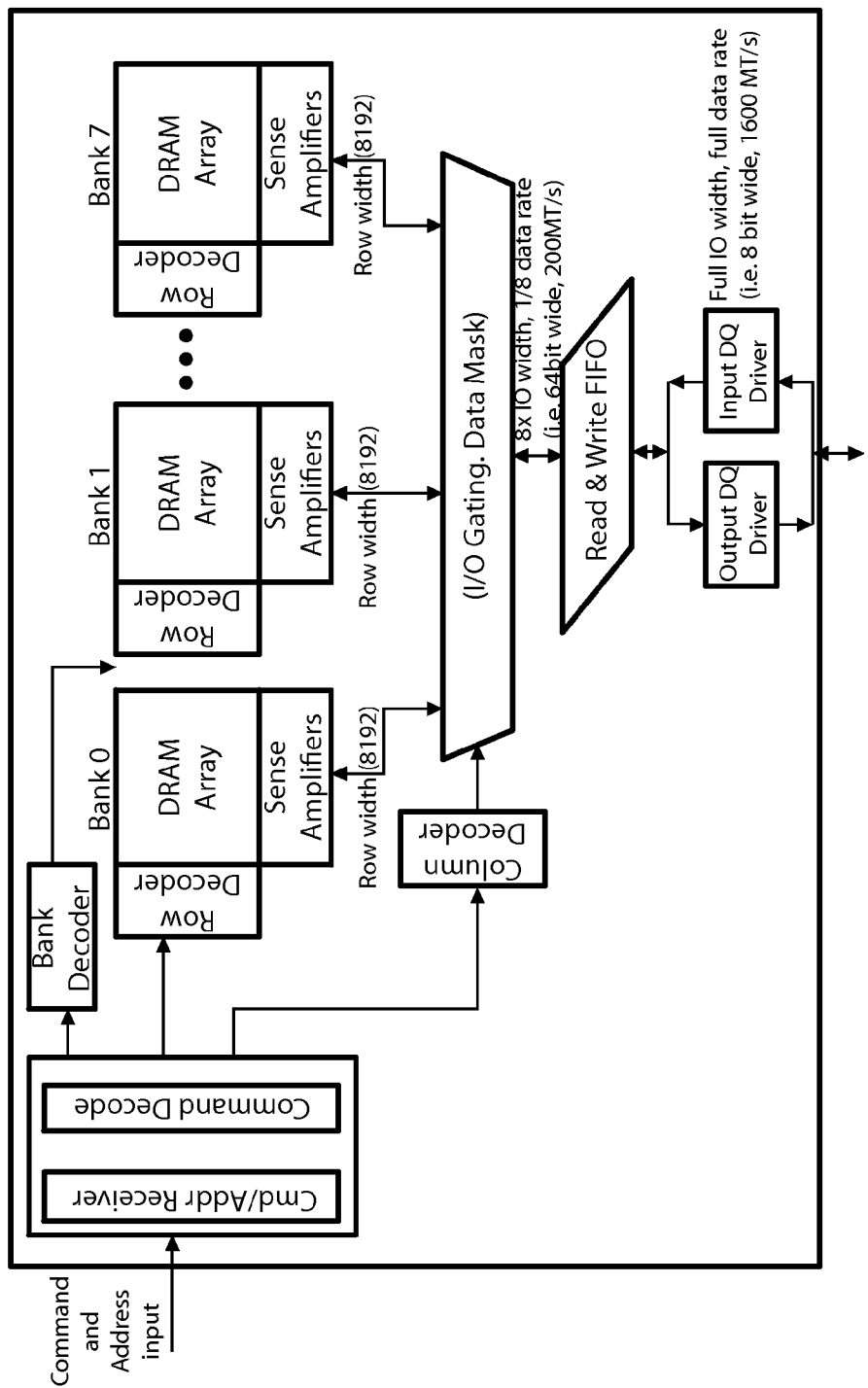
FIG. 7 is a simplified block diagram of a DRAM device according to an embodiment of the present invention.

FIG. 7 is a simplified block diagram of a DRAM device according to an embodiment of the present invention. This diagram is merely an illustration and should not unduly limit the scope of the claims herein. As shown, the DRAM device includes a command/address receiver, a command decoder, a bank decoder, a column decoder, a plurality of banks, an I/O gating data mask, a read & write FIFO, an output DQ driver, and an input DQ receiver.

The plurality of banks is shown to have banks numbered from 0-7, but can have more banks. Each of the banks includes a row decoder, sense amplifiers, and a DRAM array. In an embodiment, the command receiver and decoder receives a command and address input and outputs signals to the bank decoder, the column decoder, and the row decoder of the plurality of banks. The sense amplifiers and the column decoder are coupled to the I/O gating data mask, which is coupled to the read & write FIFO. The FIFO is coupled to the input DQ receiver and the output DQ driver.

In a specific embodiment, the bus connecting the sense amplifiers and the I/O gating data mask can have a row width of 8192. Also, the bus between the I/O gating data mask can have an 8× IO width with a ⅛ data rate. For example, the bus can be 64 bits wide with a 200 MT/s data rate. The input and output DQ can be full 10 width with full data rates, which can be 8 bits wide with a data date of 1600 MT/s. Of course, there can be other variations, modifications, and alternatives.

Figure 8:
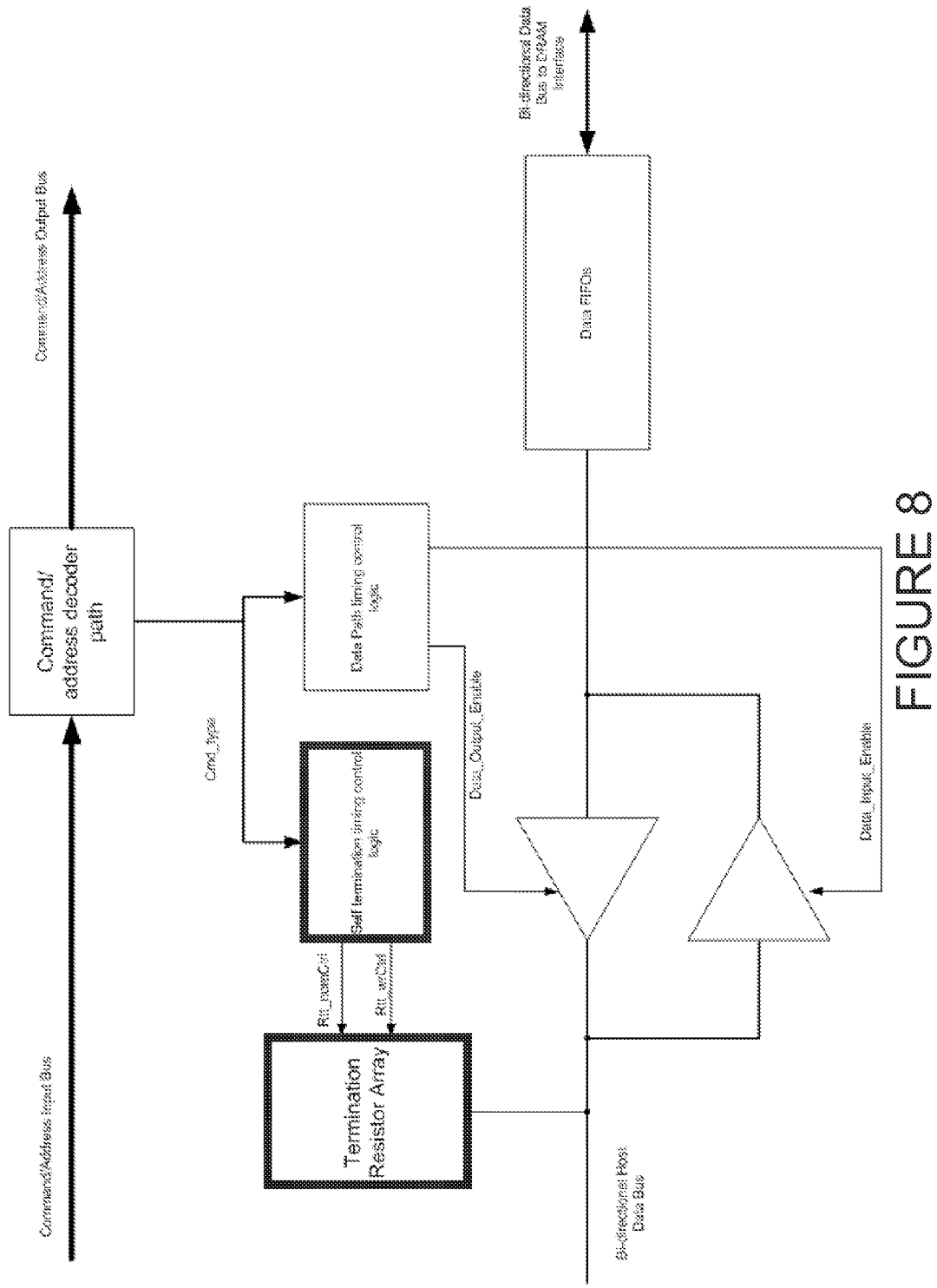
FIG. 8 is a simplified block diagram of a memory system according to an embodiment of the present invention.

FIG. 8 is a simplified block diagram of a memory system according to an embodiment of the present invention. This diagram is merely an illustration and should not unduly limit the scope of the claims herein. As shown, the memory system includes a command/address decoder path, a data path timing control logic, data FIFOs, a self-termination timing control logic, a termination resistor array, and amplifiers.

The command/decoder is coupled to a command/address I/O bus and also outputs a command type (Cmd_type) signal to the self-termination timing control logic and the data path timing control logic. The data path timing control logic outputs a Data_Output_Enable signal and a Data_Input_Enable signal, controller the flow of data on a Bi-directional Host Data Bus through the amplifiers, which are also coupled to the Data FIFOs coupled to a DRAM interface. In a specific embodiment, the self-termination timing control logic and the termination resistor array can represent a self-termination chip or device implemented in the memory system. The self-termination timing control logic outputs an Rtt_nomCtrl signal and an Rtt_wrCtrl signal to the termination resistor array. There can be other variations, modifications, and alternatives.

In a specific embodiment, the termination resistor array or array of elements comprises an array of resistor elements as shown. The termination state is provided during either the read cycle or the write cycle for each of the DRAM devices except for the selected DRAM device. That is, the termination state for the write cycle comprises receiving a write command for the selected DRAM device and adjusting a resistance value in the array of elements associated with the selected DRAM device for a predetermined number of clock cycles. The termination state for the read cycle comprises receiving a read command for the selected DRAM device and turning off a termination element in an array of elements associated with the selected DRAM device for a predetermined number of clock cycles. In an example, the plurality of DRAM devices is provided on a first DRAM module, the first DRAM module is one of plurality of DRAM modules.

Figure 9:
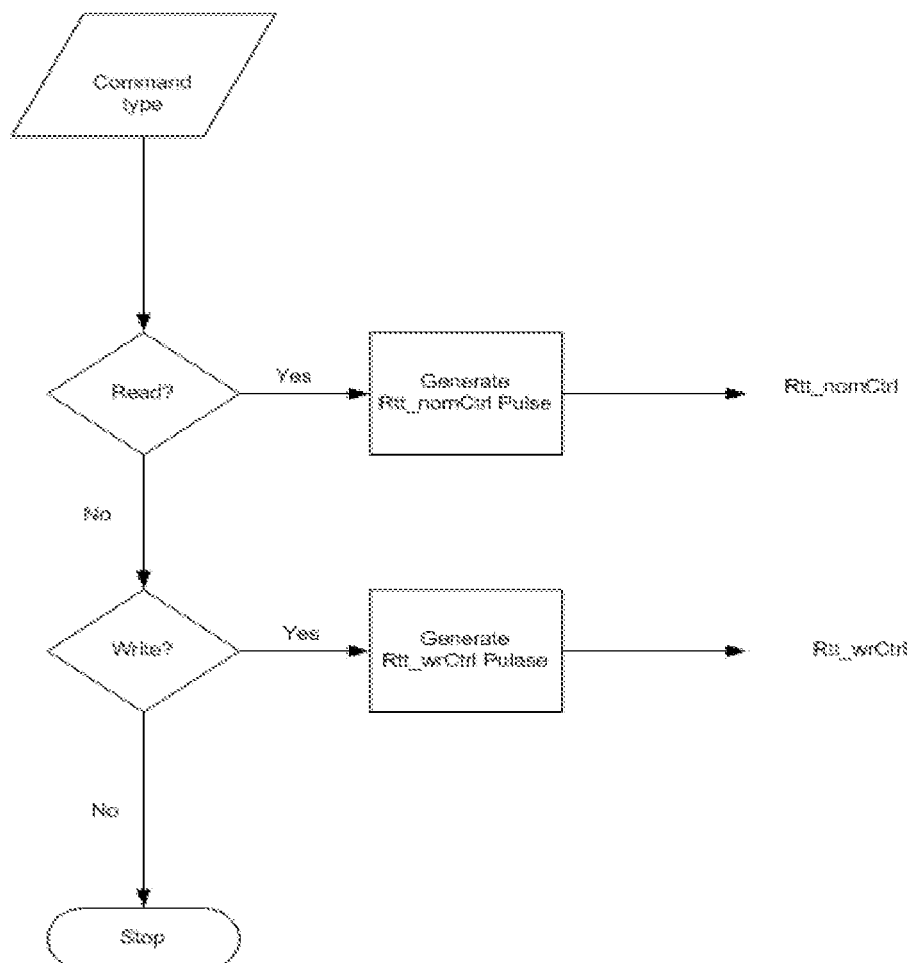
FIG. 9 is a simplified flow diagram of a method for operating a memory system according to an embodiment of the present invention.

FIG. 9 is a simplified flow diagram of a method for operating a memory system according to an embodiment of the present invention. This flow diagram is merely an illustration and should not unduly limit the scope of the claims herein. As shown, the flow diagram starts with a command type. If the command type is a READ command, then an Rtt_nomCtrl pulse is generated. If the command type is a WRITE command, then an Rtt_wrCtrl pulse is generated. If neither is command type is detected, then the no actions are issued. This flow diagram can represent the method implemented in the self-termination chip or device described previously in block diagram of FIG. 8.

In an embodiment, the present invention includes a method of operating a memory system. The method can include receiving an external clock signal from a clock device of a CPU of a host computer to a buffer device. The buffer device can be coupled to a memory controller coupled to a plurality of DIMM devices consisting of DIMM 0, DIMM 1, through DIMM N, where N is an integer of at least two and greater. In a specific embodiment, the external clock signal can be derived from a host computer external to the memory controller, buffer device, and the plurality of DIMM devices. The buffer device, memory controller, and plurality of DIMM devices can also be configured on a common substrate member.

The method can also include receiving an ODT (On Die Termination) signal from the CPU to a command port of the buffer device. An ignore state can be maintained at the buffer device for the ODT signal from the CPU. Information can be provided from a data line of only one of the plurality of DIMM devices coupled together through a common data bus interface. Meanwhile, all of the DIMM devices other than the DIMM device being read can be maintained in a termination state to prevent any signal from traversing to the common the common data bus interface.

In a specific embodiment, the buffer device can include the common data bus and an interface to the memory controller. The buffer device can also be a storage controller. Each of the DIMM devices can be self-terminated via the buffer device. Also, the interface can be transferring information at a data rate of 1600 Mbps, 3200 Mbps, or the like. Additionally, the method can include providing information from a command address bus to determine the device being read, while the other DIMM devices are in the termination state. Those of ordinary skill in the art will recognize other variations, modifications, and alternatives.

In another embodiment, the present invention includes a method for operating a computing device. The method includes receiving a command signal for a target DRAM device from a plurality of DIMM devices from a CPU device and determining whether the command signal is a read command (for a read cycle) or a write command (for a write cycle). The method also includes maintaining an ignore state upon receiving an ODT signal by decoupling any logic operation from the ODT signal and transferring information through a data line to the target DRAM device from the plurality of DIMM devices coupled together through a common data bus interface. During the information transfer, each of the other DIMM devices is maintained in a termination state to prevent any undesirable signals from traversing to the common data bus interface. There can be other variations, modifications, and alternatives.

In a specific embodiment, each of the DIMM devices is self-terminated via a buffer device. The termination state can be provided at the buffer device during either the read cycle of the write cycle detected by buffer device automatically. In the detected write cycle, the termination includes receiving the write command from the CPU device for the target DRAM device and adjusting a resistance value associated with the target DIMM for a predetermined number of clock cycles. In the detected read cycle, the termination includes receiving the read command from the CPU device for the target DIMM and also turning off the termination resistor array associated with the target DIMM for a predetermined number of clock cycles. The description of the timing diagrams of FIGS. 10 and 11 found below describe this flow diagram in more detail.

Figure 10:
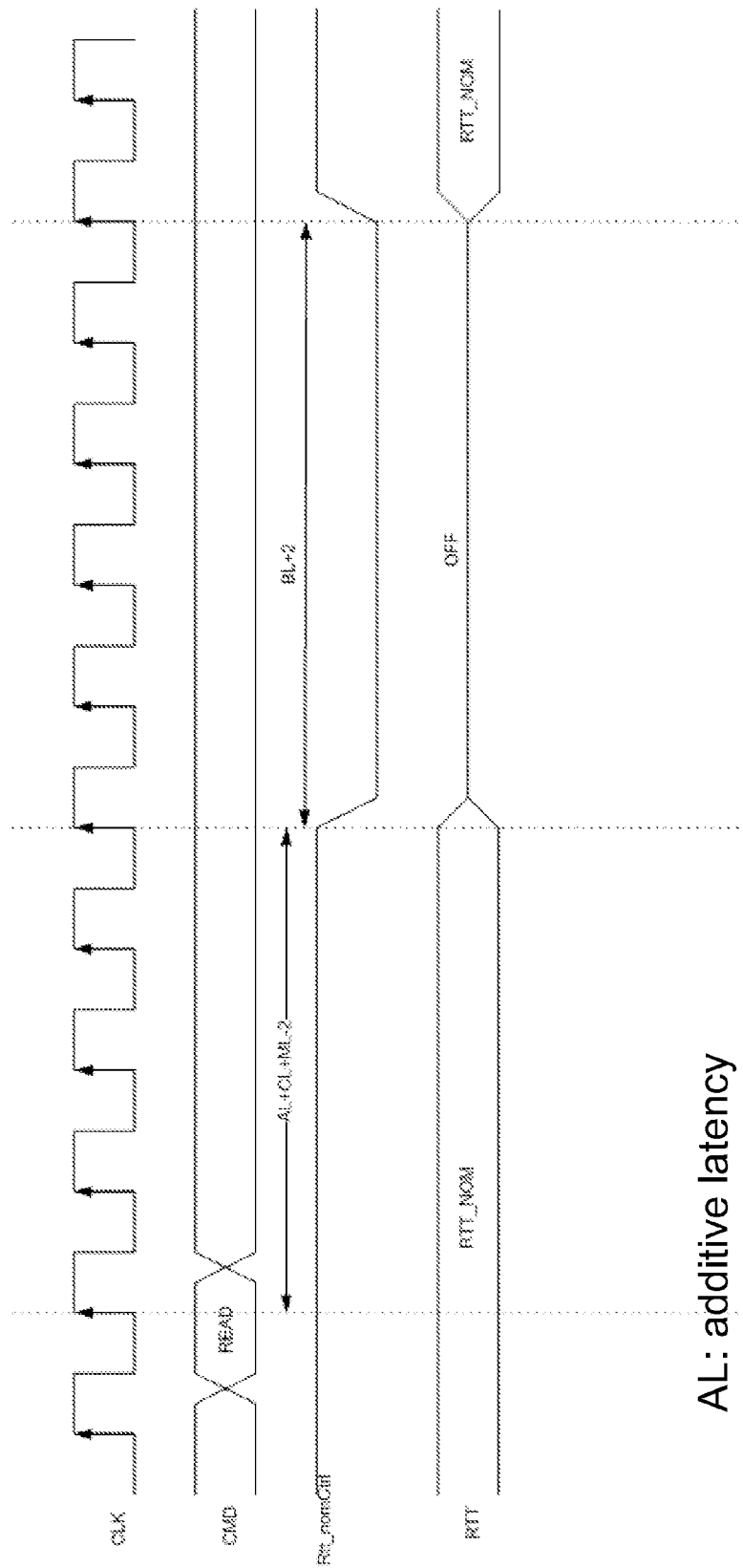
FIG. 10 is a simplified timing diagram of a memory system according to an embodiment of the present invention.

FIG. 10 is a simplified timing diagram of a memory system according to an embodiment of the present invention. This timing diagram is merely an illustration and should not unduly limit the scope of the claims herein. As shown, this read timing diagram includes the following signals: clock (CLK), command (CMD), Rtt_nomCtrl, and termination resistor array value RTT. Compared to conventional embodiments, an ODT signal from the host can be ignored for the read command. Initially, the CMD signal is empty; the Rtt_nomCtrl signal remains high, and the termination resistor array RTT remains on RTT_NOM. On the detection of the READ signal from CMD, shown on the rising clock edge, the Rtt_nomCtrl signal is shown to switch to a low mode. This switch occurs with a delay after detection, the delay being the sum of an additive latency (AL), a CAS latency (CL), a memory burst latency (ML) minus two. As Rtt_nomCtrl switches to low, the termination resistor array RTT switches to off state (infinite). The duration that the Rtt_nomCtrl signal remains low is shown to be a burst length (BL) plus two. While Rtt_nomCtrl remains low, the termination resistor array RTT remains off. As Rtt_nomCtrl returns to high, the termination resistor array RTT switches back to RTT_NOM. Those of ordinary skill in the art will recognize other variations, modifications, and alternatives.

Figure 11:
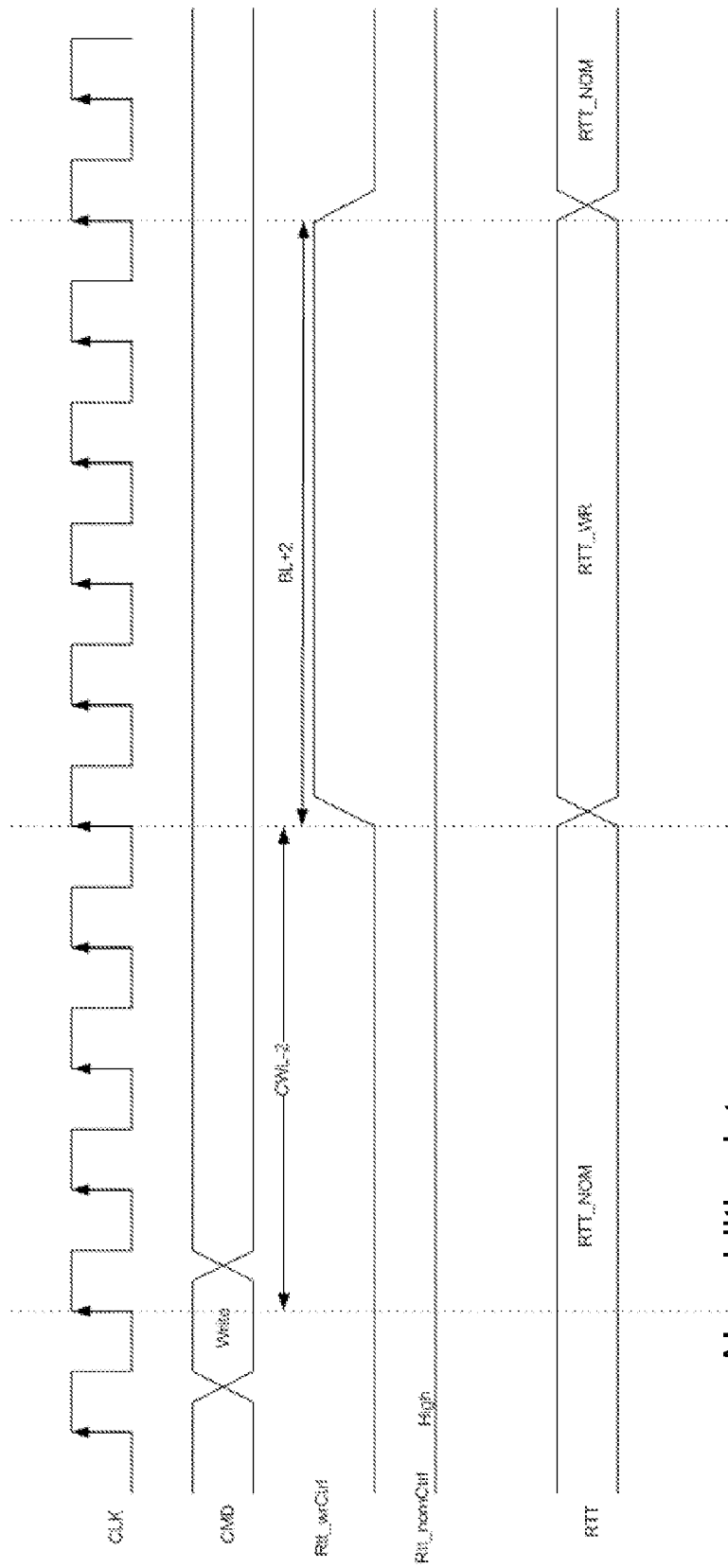
FIG. 11 is a simplified timing diagram of a memory system according to an embodiment of the present invention.

FIG. 11 is a simplified timing diagram of a memory system according to an embodiment of the present invention. This write timing diagram is merely an illustration and should not unduly limit the scope of the claims herein. As shown, this timing diagram includes the following signals: clock (CLK), command (CMD), Rtt_wrCtrl, Rtt_nomCtrl, and RTT. Compared to conventional embodiments, an ODT signal from the host can be ignored for the write command. Initially, the CMD signal is empty, Rtt_wrCtrl remains low, Rtt_nomCtrl remains high, and the termination resistor array RTT remains RTT_NOM. On detection of the WRITE signal from CMD, shown on the rising clock edge, the Rtt_wrCtrl signal is shown to switch to a high mode. This switch occurs with a delay after detection, the delay being a CAS write latency minus two. As Rtt_wrCtrl switches to high, the termination resistor array RTT switches to RTT_WR. The duration that the Rtt_wrCtrl signal remains high is a burst length (BL) plus 2, which is similar to the Rtt_nomCtrl signal in the READ scenario. While Rtt_wrCtrl remains high, the termination resistor array RTT remains RTT_WR. As Rtt_wrCtrl returns to low, the termination resistor array RTT switches back to RTT_NOM. Rtt_nomCtrl remains high through the WRITE command. As stated previously, there can be other variations, modifications, and alternatives.

FIG. 12 is a simplified diagram of a logic table for a memory system according to an embodiment of the present invention. This flow diagram is merely an illustration and should not unduly limit the scope of the claims herein. As shown, the table includes logic values for a termination resistor array wherein resistor array resistance values correspond to specific combinations of signals from Rtt_nomCtrl and Rtt_wrCtrl, shown previously in the block diagram of FIG. 8 as well as the timing diagrams of FIGS. 10 and 11. In a specific embodiment, the resistance values include infinity (float), Rtt_nom, and Rtt_wr. The latter two are register defined resistance values. Rtt_nom is only asserted (read) when Rtt_nomCtrl is logic 1 and Rtt_wrCtrl is logic 0, whereas Rtt_wr is asserted (write) when Rtt_nomCtrl is logic 1 and Rtt_wrCtrl is logic 1. When Rtt_nomCtrl is logic 0, the value remains at infinity. Those of ordinary skill in the art will recognize other variations, modifications, and alternatives.

Figure 13:
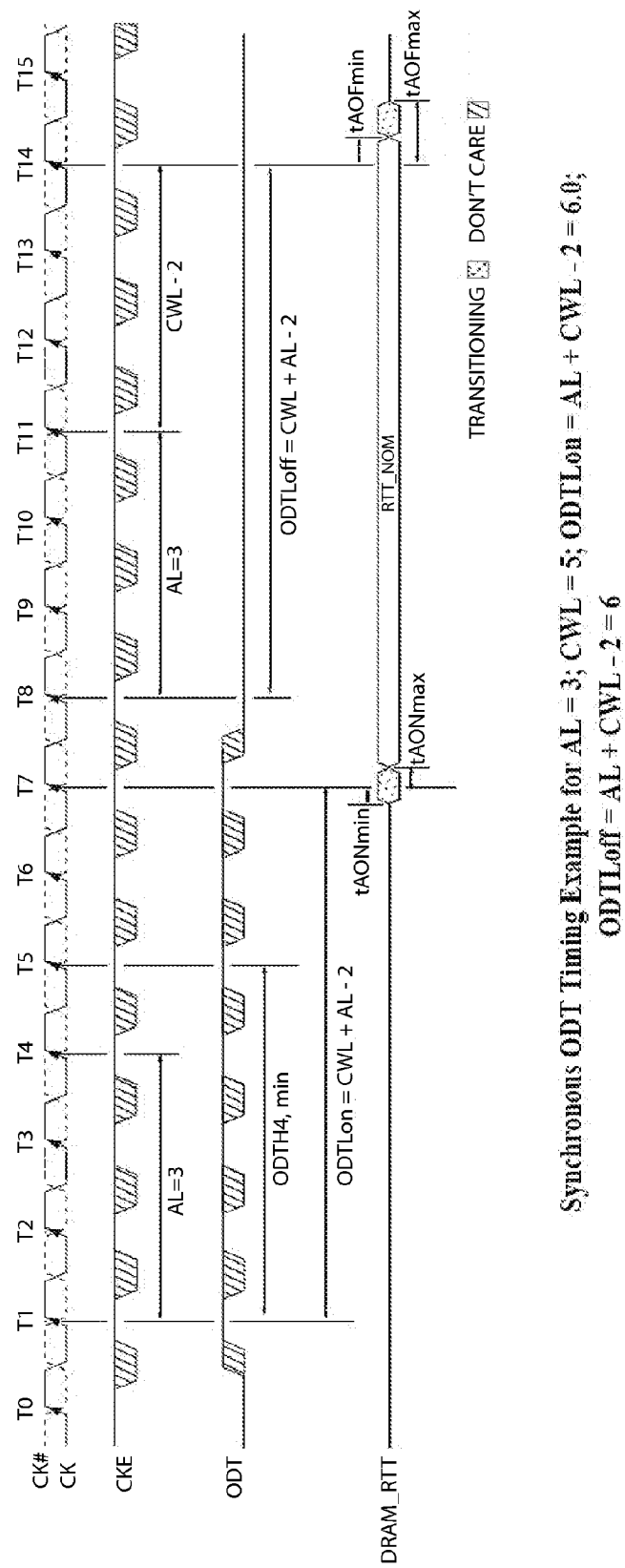
FIG. 13 is a simplified timing diagram of a memory system according to a conventional embodiment.

FIG. 13 is a simplified timing diagram of a memory system according to a conventional embodiment. This timing diagram can represent a memory device according to a JEDEC standard. As shown, the timing diagram reflects a synchronous ODT timing example wherein the termination Rtt turn-on and turn-off timing is controlled by the ODT signal from a host. In this configuration, the memory buffer/DRAM internal ODT signal is delayed for a number of clock cycles defined by the additive latency (AL) relative to the external ODT signal. For example, ODTLin=ODTLoff=CWL+AL−2. According to the example depicted, AL=3 and CAS write latency (CWL)=5, thus ODTLon=ODTLoff=5+3−2=6.

Figure 14:
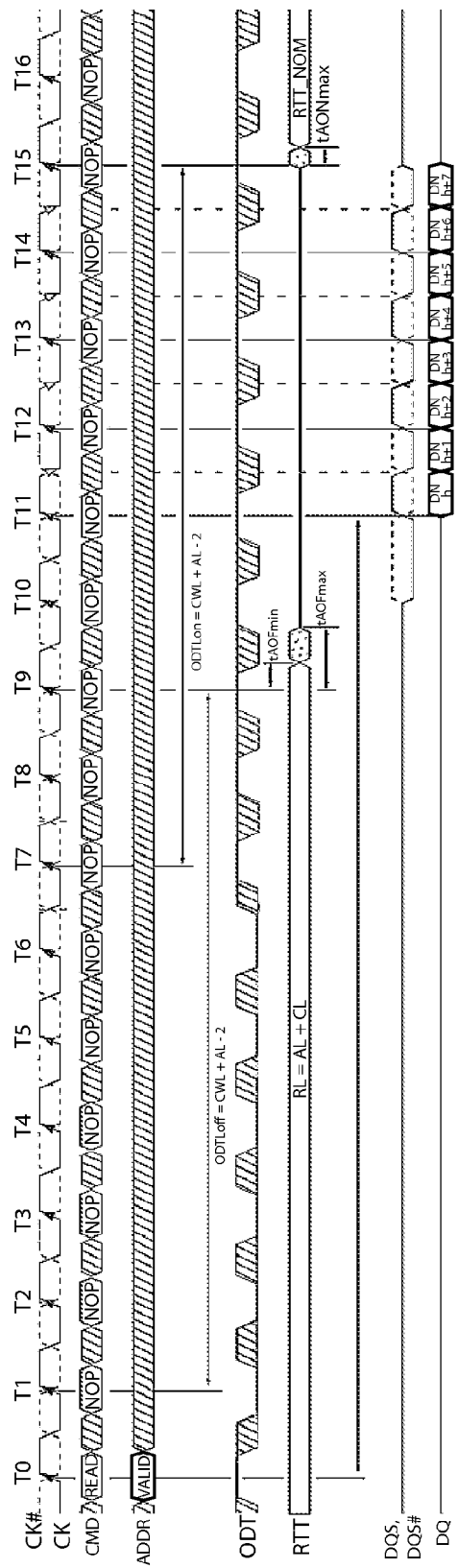
FIG. 14 is a simplified timing diagram of a memory system according to a conventional embodiment.

FIG. 14 is a simplified timing diagram of a memory system according to a conventional embodiment. This timing diagram shows a read operation of a memory device according to the JEDEC standard. Here, a read command is shown to require that the ODT signal be disabled externally by driving ODT low. In this example, CAS latency (CL)=6, AL=CL−1=5, Read Latency (RL)=AL+CL=11, and CWL=5. Thus, ODTLon=ODTLoff=CWL+AL−2=8.

Figure 15:
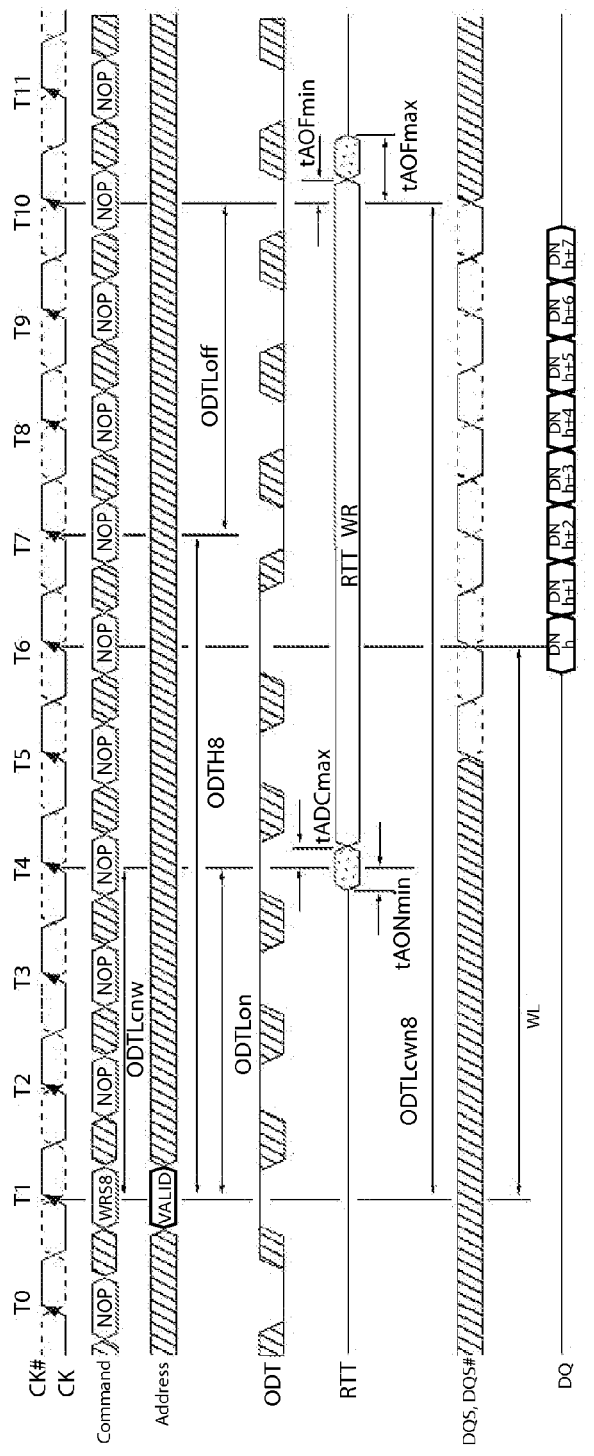
FIG. 15 is a simplified timing diagram of a memory system according to a conventional embodiment.

FIG. 15 is a simplified timing diagram of a memory system according to a conventional embodiment. This timing diagram shows a write command of a memory device according to the JEDEC standard. As shown, the memory buffer/DRAM Rtt_wr switching time is also controlled by the host ODT signal during the write command. In this example, the ODT pin is being asserted together with the write command for a duration of 6 clock cycles.

Figure 16:
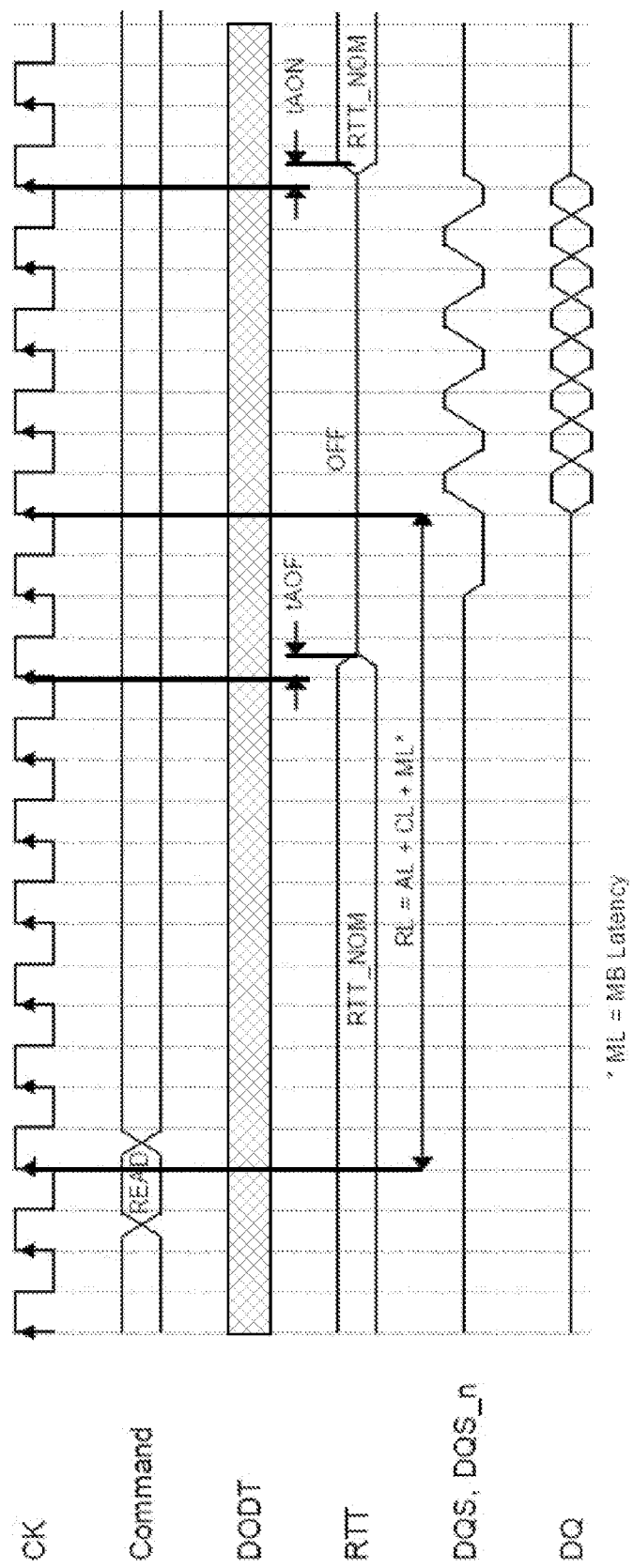
FIG. 16 is a simplified timing diagram of a memory system according to an embodiment of the present invention.

FIG. 16 is a simplified timing diagram of a memory system according to an embodiment of the present invention. This timing diagram is merely an illustration and should not unduly limit the scope of the claims herein. FIG. 16 shows the ODT timing during a read command according to an embodiment of a self-controlled termination timing configuration similar to the configuration described above for FIG. 10. In this embodiment, the DODT signal from the host controller is ignored and the Rtt on and off timings are controlled internally in the memory buffer. In this mode, the host interface ODT is turned off one clock cycle before the read preamble and turned back on in the cycle after the post-ample by default. In contrast to the example of FIG. 14, RL=AL+CL+ML, the ML being a memory buffer latency.

Figure 17:
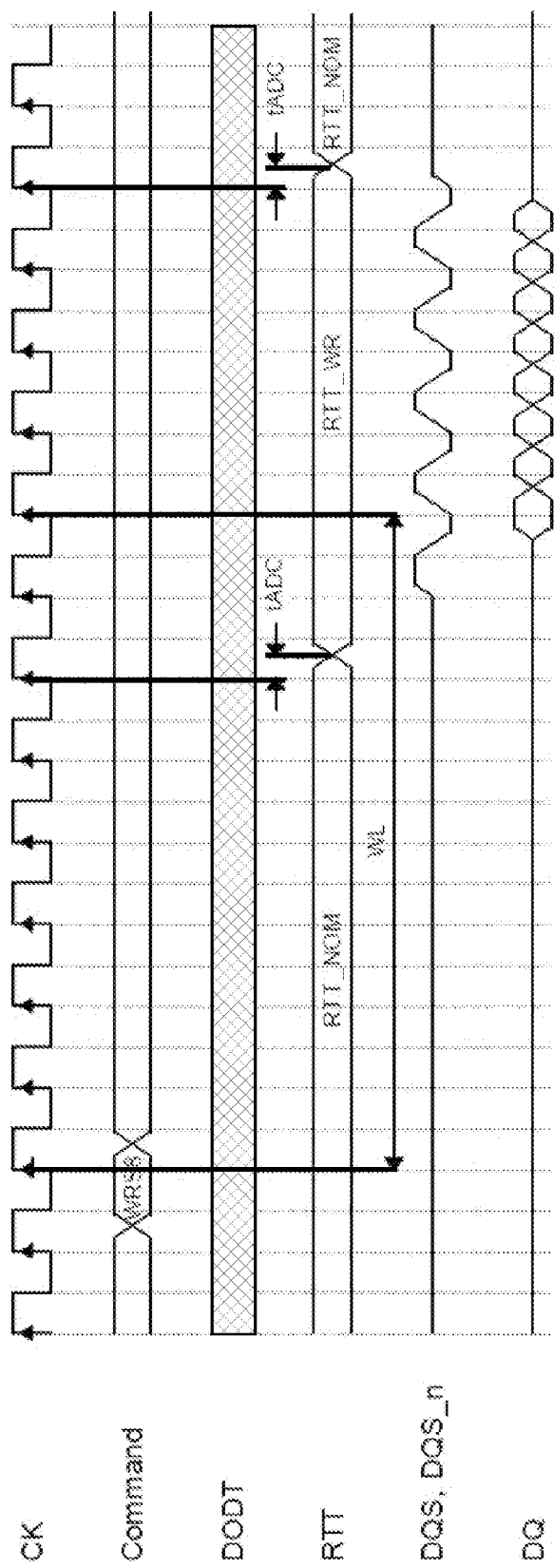
FIG. 17 is a simplified timing diagram of a memory system according to an embodiment of the present invention.

FIG. 17 is a simplified timing diagram of a memory system according to an embodiment of the present invention. This timing diagram is merely an illustration and should not unduly limit the scope of the claims herein. FIG. 17 shows the ODT timing during a write command according to an embodiment of a self-controlled termination timing configuration similar to the configuration described above for FIG. 11. In this embodiment, the host interface DODT signal is ignored in the memory buffer. The memory buffer Rtt will switch from RTT_NOM to RTT_WR one clock cycle before the write preamble and will switch back to RTT_NOM in the cycle after the post-amble of the write. Similar to the read command, the timing is controlled by the memory buffer itself instead of the ODT signals from the host controller. Of course, those of ordinary skills in the art will recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of operating a memory system, the method comprising:
receiving an external clock signal from a clock device of a CPU of a host computer to a buffer device, the buffer device being coupled to a memory controller, the memory controller being coupled to a plurality of DIMM devices consisting of DIMM 0, DIMM 1, through DIMM N, where N is an integer;
transferring an ODT (On Die Termination) signal from the CPU to a command port of the buffer device; and
providing a termination array value and a timing information for a data line of only one of the plurality of DIMM devices coupled together through a common data bus interface, while maintaining all of the DIMM devices in a termination state other than the DIMM device being read or write to prevent any other signal from traversing to the common data bus interface, wherein the providing is not based upon the ODT signal.

2. The method of claim 1 wherein the buffer device comprises the common data bus and an interface to the memory controller; wherein the termination array value is provided from a resistor value.

3. The method of claim 1 wherein the buffer device is a storage controller.

4. The method of claim 1 wherein the external clock signal is derived from a host computer external to the memory controller, buffer device, and the plurality of DIMM devices.

5. The method of claim 1 wherein the interface is transferring information at a data rate of 1600 MBPS on a command bus coupled to the command port.

6. The method of claim 1 wherein the interface is transferring information at a data rate of 3200 MBPS on a bi-directional data bus.

7. The method of claim 1 wherein the buffer device, memory controller, and plurality of DIMM devices are configured on a common substrate member; wherein the plurality of DIMM devices comprising a first DIMM device having a first read or write latency characteristic and a second DIMM device having a second read or write latency characteristic such that the first read or write latency characteristic is different from the second read or write latency characteristic by more than one clock cycle.

8. The method of claim 1 wherein each of the DIMM devices is self-terminated via the buffer device; and further comprising providing address information from a command address bus to select the one DIMM device being in a read cycle or a write cycle, while each of the other DIMM devices is in the termination state.

9. The method of claim 1 wherein the termination state is provided at the buffer device during either a read cycle or a write cycle, the termination for the write cycle comprises receiving a write command from the CPU for a target DIMM and adjusting a resistance value for the target DIMM for a predetermined number of clock cycles, the termination for the read cycle comprises receiving a read command from the CPU for a target DIMM and turning off a termination element in an array of elements for the target DIMM for a predetermined number of clock cycles.

10. A method for operating a computing device, the method comprising:
receiving a command signal for a target DRAM device from a plurality of DIMM devices from a CPU device;
determining whether the command signal is either a read command for a read cycle or write command for a write cycle;
decoupling any logic operation from an ODT (On Die Termination) signal received from the CPU device; and
transferring information through a data line to the target DRAM device from the plurality of DIMM devices coupled together through a common data bus interface, while maintaining each of the other DIMM devices in a termination state to prevent any undesirable signals from traversing to the common data bus interface.

11. The method of claim 10 wherein each of the DIMM devices is self-terminated via a buffer device.

12. The method of claim 10 wherein the termination state is provided at a buffer device during either the read cycle or the write cycle, the termination for the write cycle comprises receiving the write command from the CPU device for the target DRAM device and adjusting a resistance value associated with the target DIMM for a predetermined number of clock cycles, the termination for the read cycle comprises receiving the read command from the CPU device for the target DIMM and turning off a termination element associated with the target DIMM for a predetermined number of clock cycles.

13. A memory system comprising a device, the device comprising:
a bi-directional data bus line port;
a command line port;
an address line port;
an array of elements coupled to the logic block; and
a logic block coupled to the bi-directional data bus line port, the command line port, and the address line port, and configured with the array of elements to provide a termination state to each of a plurality of DRAM devices while allowing a selected DRAM device to have access to the bi-directional data bus line port during a read cycle or a write cycle.

14. The system of claim 13 wherein the array of elements comprises an array of resistor elements; and whereupon the termination state is provided during either the read cycle or the write cycle, the termination state for the write cycle comprises receiving a write command for the selected DRAM device and adjusting a resistance value in the array of elements associated with the selected DRAM device for a predetermined number of clock cycles, the termination state for the read cycle comprises receiving a read command for the selected DRAM device and turning off a termination element in an array of elements associated with the selected DRAM device for a predetermined number of clock cycles.

15. The system of claim 13 wherein the plurality of DRAM devices is provided on a first DRAM module, the first DRAM module is one of plurality of DRAM modules.

16. The system of claim 13 wherein further comprising a bi-directional data bus coupled to the bi-directional data bus port, the bi-direction data base is configured to transfer information from the selected DRAM at a data rate of 1600 Mbps and greater, while being free from any residual signals that are derived from any non-selected DRAM devices or any previously transferred information on the bi-directional data bus.

17. The system of claim 13 further comprising a host CPU device coupled to the memory buffer device, the host CPU device is configured to maintain an On Die Termination) ODT signal in an off-state.

18. The system of claim 13 wherein the plurality of DRAM devices is provided on a first DRAM module, the first DRAM module is one of plurality of DRAM modules, the plurality of DRAM modules including the first DRAM module and a second DRAM module, the first DRAM module having a first read or write latency characteristic and the second DRAM module having a second read or write latency characteristic such that the first read or write latency characteristic is different from the second read or write latency characteristic by more than one clock cycle.

19. The system of claim 13 wherein the device is provided in one of a memory storage system, a network appliance, a computer storage systems, a computer server, a hand held computing device, a portable computing device, a switch, a router, or a gateway.

20. The method of claim 1 wherein the host computer is provided in one of a memory storage system, a network appliance, a computer storage systems, a computer server, a hand held computing device, a portable computing device, a switch, a router, or a gateway.

* * * * *